(12) United States Patent
Berge et al.

(10) Patent No.: US 6,223,385 B1
(45) Date of Patent: May 1, 2001

(54) MODULAR APPARATUS FOR WASHING AND WIPING A VEHICLE WINDSHIELD

(75) Inventors: Gilles Berge, Rambouillet; Jean-Pierre Eustache, Antony; Jean-Louis Roumegoux, Paris, all of (FR)

(73) Assignee: Valeo Systemes d'Essuyage (FR)

( * ) Notice: Subject to any disclaimer, the term of this patent is extended or adjusted under 35 U.S.C. 154(b) by 767 days.

(21) Appl. No.: 08/506,857

(22) Filed: Jul. 25, 1995

(30) Foreign Application Priority Data

Jul. 26, 1994 (FR) .................................................. 94 09335

(51) Int. Cl.$^7$ ....................................................... A97L 1/00
(52) U.S. Cl. ..................... 15/250.3; 296/197; 296/96.15; 359/841
(58) Field of Search ...................... 15/250.003, 250.01, 15/250.02, 250.03, 250.04; 296/96.15, 146.1, 152, 197; 359/838, 841, 871

(56) References Cited

U.S. PATENT DOCUMENTS

| 4,179,153 | 12/1979 | Cole, Jr. . |
| 5,082,078 | 1/1992 | Umeda et al. . |

FOREIGN PATENT DOCUMENTS

| 3704325 | 8/1988 | (DE) . |
| 40 40 731 | 3/1990 | (DE) . |
| 3929875 | 3/1991 | (DE) . |
| 0 588 708 | 9/1993 | (EP) . |
| 704526 | 3/1931 | (FR) . |
| 2668110 | 4/1992 | (FR) . |
| 2684950 | 6/1993 | (FR) . |

OTHER PUBLICATIONS

La Fonction grille d'auvent, 1141 Ingenieurs de l'Automobile (1993) Juin/Juillet, No. 682, Garches, FR.
French Search Report 21 Apr. 1995.

*Primary Examiner*—Terrence R. Till
(74) *Attorney, Agent, or Firm*—Morgan & Finnegan, LLP

(57) ABSTRACT

A vehicle has a windshield and a hood extending away from the lower edge of the windshield. A modular windshield washing and wiping apparatus, disposed adjacent to the lower edge of the windshield, comprises at least two modules, arranged to be assembled together and to the remainder of the vehicle. One of the modules contains a screen washing liquid so as to act as a reservoir for the latter, while another module carries the screen wiping equipment. One of the modules carries at least one rear view mirror of the vehicle.

5 Claims, 2 Drawing Sheets

MODULAR APPARATUS FOR WASHING AND WIPING A VEHICLE WINDSHIELD

FIELD OF THE INVENTION

The present invention relates to apparatus for washing and wiping a vehicle windshield, in particular for a motor vehicle which has a hood extending away from the lower edge of the windshield.

BACKGROUND OF THE INVENTION

In such a vehicle, the space which lies between the hood and the lower edge of the windshield is conventionally used for accommodating the windshield wiper system. The same space is also used for admission of fresh air to the interior of the vehicle, which has an air inlet grille overlying this space. The vehicle also has screen washing means for washing the windshield, comprising a screen washing liquid reservoir together with means for spraying this liquid on to the windshield.

Conventionally, the screen washing liquid reservoir is arranged underneath the hood, in the front compartment of the vehicle. During manufacture, the operations of fitting on the vehicle the screen wiping means, the air admission means, the air inlet grille, and the reservoir and spraying components of the screen washing apparatus, are functions which require a considerable amount of time to accomplish. These assembly and fitting operations are not easy to carry out using automatic assembly machinery, and as a result they are particularly expensive.

It has been proposed to provide monobloc, or unitary, screen wiping and washing apparatus, in which the air admission means, the screen washing liquid reservoir, the screen wiping means and the means for directing the washing liquid on to the windshield, are all integrated, with a view to simplifying the operations of fitting these various components in the vehicle, and to make it possible to carry out these operations using automatic means.

It has also been proposed to provide a modular apparatus for wiping and washing the windshield of a vehicle, which avoids the use of monobloc wiping and washing apparatus that has to be specially adapted to a given model of vehicle. To this end, such a known apparatus includes at least one common module which can be used on various types or models of vehicle, thus tending to reduce manufacturing costs and providing the advantage of an economy of scale. More particularly, the modular apparatus comprises at least two modules, which can be assembled together and to the remainder of the vehicle, with one of the two modules being adapted to contain a screen washing liquid, so as to constitute a reservoir for the latter, while the other module acts as a support for the windshield wiping system itself.

An object of the present invention is to propose an improvement to such a design for a modular apparatus, such as to improve the modular character of the apparatus and to extend the advantages that result from the facility for assembling and fitting such an apparatus.

DISCUSSION OF THE INVENTION

According to the invention, a modular apparatus for washing and wiping a vehicle windshield comprises a hood extending away from the lower edge of the windshield, the apparatus being of the type comprising at least two modules arranged for assembly together and to the remainder of the vehicle, with one of the modules being adapted to contain a screen washing liquid so as to constitute a reservoir for the latter, while the other module supports means for wiping the windshield, is characterised in that one of the modules serves to support at least one wing mirror.

Further features and advantages of the invention will appear more clearly from a reading of the detailed description which follows, of preferred embodiments of the invention given by way of example only and with reference to the accompanying drawings.

DESCRIPTION OF PREFERRED EMBODIMENTS OF THE INVENTION

Figure 1:
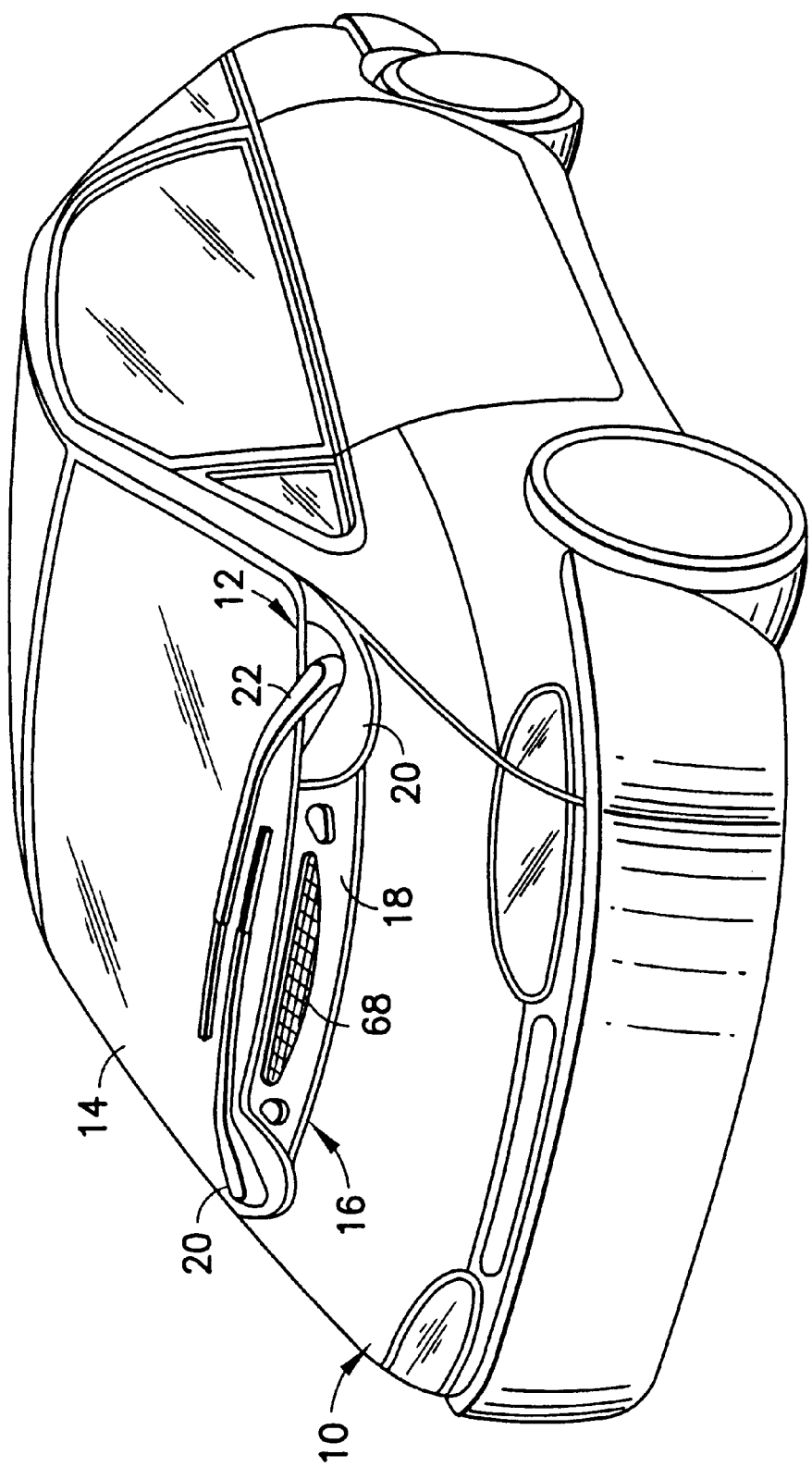
FIG. 1 is a diagrammatic perspective view showing a vehicle having a modular apparatus in accordance with the current state of the art.

FIG. 1 shows, diagrammatically and in perspective, a motor vehicle having a hood 10 lying below the level of, and extending forward from, the lower edge 12 of the windshield 14 of the vehicle. The hood 10 is equipped with a modular apparatus 16 for washing and wiping the windshield 14 in accordance with the current state of the art.

In the example shown in FIG. 1, the modular apparatus 16 consists of a module which defines a reservoir 18, together with two screen wiping modules 20.

The reservoir module 18 has an exposed upper face which is generally flat and which forms an extension of the outer surface of the hood 10. This upper face extends longitudinally over part of the width of the vehicle, on either side of a longitudinal plane of symmetry of the bodywork of the vehicle. The reservoir module 18 extends laterally between the hood 10 and the lower edge 12 of the windshield 14.

The screen wiping modules 20 also have an exposed upper face, which again forms an extension of the outer surface of the hood 10. The modules 20 are arranged on either side of the reservoir module 18, of which they form an extension towards the sides of the vehicle. The modules 20 overlie the space that exists between the hood 10 and the lower edge 12 of the windshield 14. Each screen wiping module 20 carries a screen wiper arm 22, of a kind known per se and having at one of its ends means for fastening the arm 22 on a drive spindle (not shown), which is coupled to means for driving the spindle in rotation. The other end of each wiper arm carries a conventional wiper blade which includes a wiping strip for wiping over the windshield 14.

Figure 2:
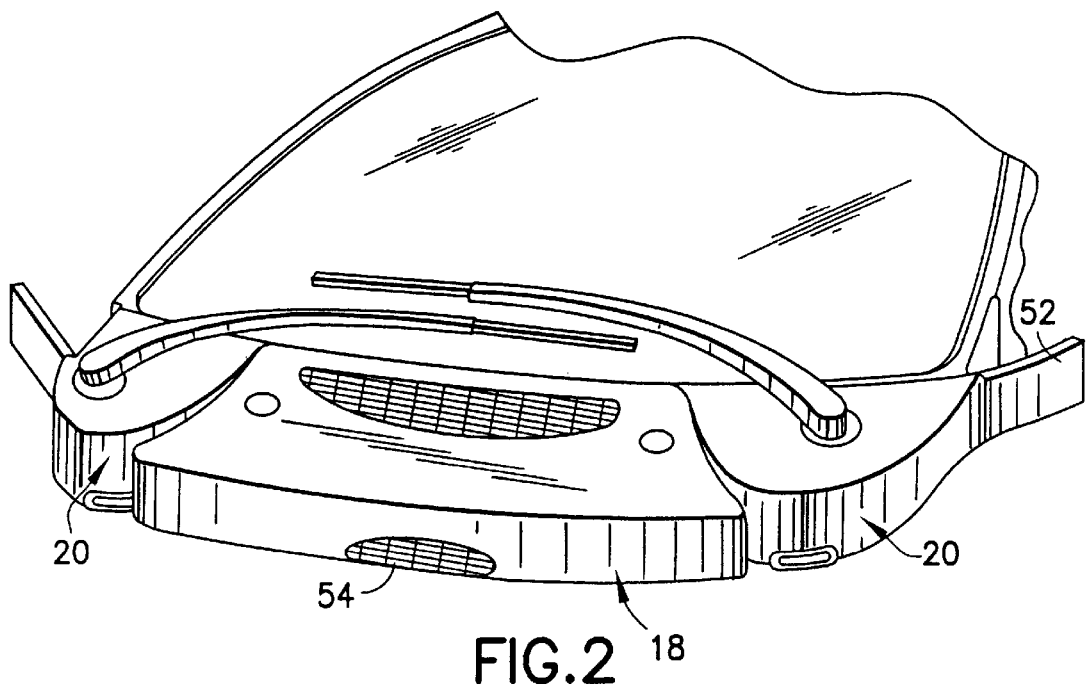
FIG. 2 is a detailed perspective view on a larger scale, showing a first embodiment of a modular apparatus in accordance with the invention.

Reference is now made to FIG. 2, showing a first embodiment of the present invention, in which each of the screen wiping modules 20 supports a wing element 52. This wing element 52 is a one-piece moulded component for a wing mirror or external rear view mirror of the vehicle, and it may also be made integrally with the corresponding module 20.

The washing reservoir module 18 may also be arranged to carry a lamp 54 for lighting the engine compartment of the vehicle. Similarly, each of the modules 20 may carry a flashing indicator light 56.

Figure 3:
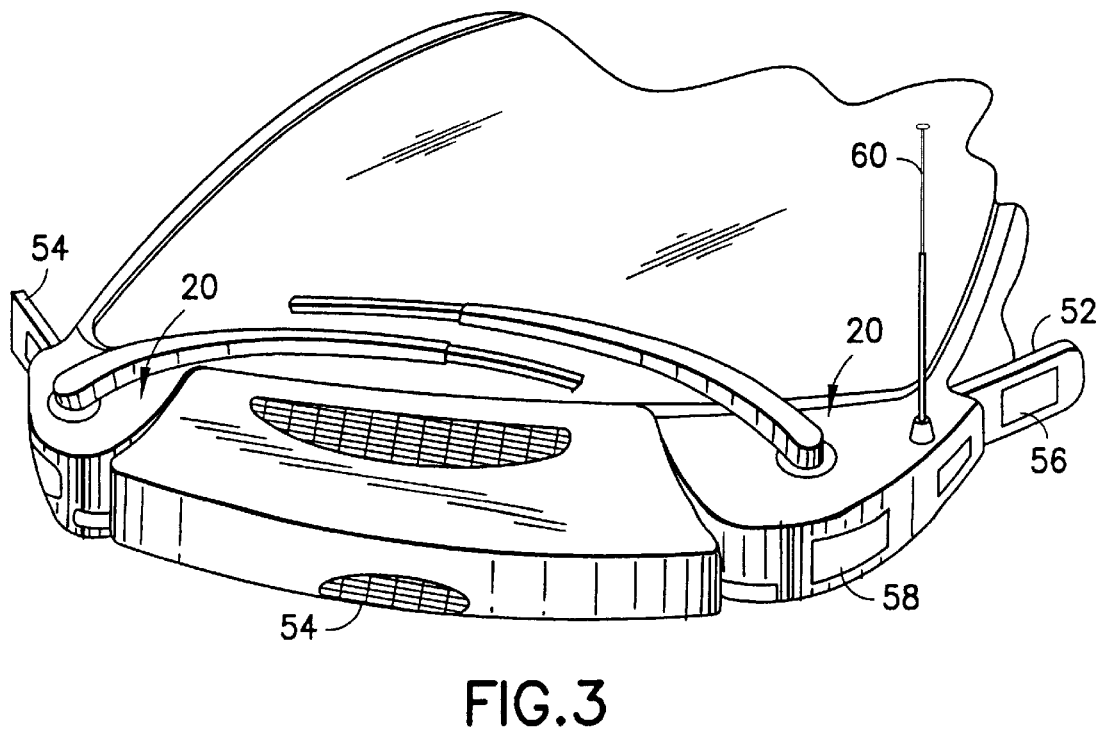
FIG. 3 is a view similar to FIG. 2, showing a second embodiment of a modular apparatus in accordance with the invention.

In the embodiment shown in FIG. 3, the wing mirrors 52 are suitably articulated on the wiper modules 20. They may be articulated in such a way as to be retractable, and may, as shown in FIG. 3, include flashing indicator lights 56 or indicator light repeaters.

What is claimed is:

1. A modular screen washing and wiping apparatus, for a windshield of a vehicle which includes the windshield, the windshield defining a lower edge thereof, and a hood extending away from said lower edge, the modular apparatus including windshield wiping means and comprising a plurality of modules adapted for assembly together and to the vehicle, with one of said modules constituting a windshield washing liquid reservoir and another of said modules carrying the windshield wiping means, the apparatus further including at least one rear view mirror carried on said plurality of assembled modules.

2. Apparatus according to claim 1, wherein the rear view mirror is fixed.

3. Apparatus according to claim 1, wherein the rear view mirror is made integrally with said plurality of assembled modules.

4. Apparatus according to claim 1, wherein the rear view mirror articulated on said plurality of assembled modules.

5. Apparatus according to claim 4, wherein the rear view mirror on said plurality of assembled modules is arranged to be retracted with respect to said assembled plurality of modules.

* * * * *